(12) United States Patent
Chhaya et al.

(10) Patent No.: US 6,484,833 B1
(45) Date of Patent: Nov. 26, 2002

(54) APPARATUS AND METHOD FOR MAINTAINING STATE OF CHARGE IN VEHICLE OPERATIONS

(75) Inventors: Sunil M. Chhaya, Troy; Robert L. Morris, Milford; Kevin S. Kidston, New Hudson, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/527,704

(22) Filed: Mar. 17, 2000

(51) Int. Cl.⁷ .................................................. B60K 1/00
(52) U.S. Cl. ..................... 180/65.4; 180/65.2; 180/65.3
(58) Field of Search .............................. 180/65.1, 65.2, 180/65.3, 65.4

(56) References Cited

U.S. PATENT DOCUMENTS

| | | | | |
|---|---|---|---|---|
| 5,495,906 A | * | 3/1996 | Furutani | 180/65.2 |
| 5,806,617 A | * | 9/1998 | Yamaguchi | 180/65.2 |
| 5,820,172 A | * | 10/1998 | Brigham et al. | 290/40 C |
| 5,839,533 A | * | 11/1998 | Mikami et al. | 180/165 |
| 5,990,662 A | * | 11/1999 | Yang | 320/130 |
| 6,007,443 A | * | 12/1999 | Onimaru et al. | 475/5 |
| 6,137,250 A | * | 10/2000 | Hirano et al. | 180/65.2 |
| 6,166,517 A | * | 12/2000 | Wakashiro et al. | 320/104 |
| 6,232,744 B1 | * | 5/2001 | Kawai et al. | 320/132 |
| 6,242,873 B1 | * | 6/2001 | Drozdz et al. | 318/139 |
| 6,278,196 B1 | * | 8/2001 | Ehrhart et al. | 290/40 C |
| 6,278,915 B1 | * | 8/2001 | Deguchi et al. | 701/22 |

* cited by examiner

Primary Examiner—Robert P. Olszewski
Assistant Examiner—James S. McClellan
(74) Attorney, Agent, or Firm—Christopher DeVries (57) ABSTRACT

A propulsion system for use in a hybrid vehicle, wherein a first propulsion system provides a driving force to a first pair of wheels and a second propulsion system provides a driving force to a second pair of wheels. A system controller actuates the propulsion systems determines the necessary commands to be provided to the first and second propulsion systems so as to provide the vehicle with the most efficient driving and/or stopping force.

14 Claims, 10 Drawing Sheets

APPARATUS AND METHOD FOR MAINTAINING STATE OF CHARGE IN VEHICLE OPERATIONS

The present invention is related to a method and apparatus for maintaining a state of charge (SOC) for electric batteries in a parallel hybrid electric vehicle (PHEV).

BACKGROUND OF THE INVENTION

Passenger comfort and fuel efficiency have set forth increasing demands on automotive vehicle designs. It is a primary goal of most vehicle designs to provide a more efficient vehicle without having to sacrifice passenger comfort and satisfaction.

Moreover, and as alternative vehicle propulsion systems are implemented, passenger comfort and fuel efficiency are sometimes in opposition to each other. This is particularly true in hybrid vehicle designs.

A Hybrid Vehicle is a vehicle that has two sources of propulsion. A hybrid electric vehicle (HEV) is a vehicle wherein one of the sources of propulsion is electric and the other source of propulsion may be derived from fuel cells or an internal combustion engine (ICE) that burns diesel, gasoline or any other source of fuel.

Generally, a hybrid vehicle utilizes either one or two drive trains wherein the internal combustion engine (ICE) provides torque to one of the drive trains and an electrical driving force is applied to either of both of the drive trains.

In addition and in order to provide a secondary source of power, hybrid vehicles also utilize a concept known as regenerative braking. Generally, regenerative braking is the conversion of the vehicle's kinetic energy into a source of electrical power. The vehicle's kinetic energy is converted from the spinning wheels, in response to a user request to slow or stop the vehicle. A generator is manipulated, and accordingly, produces electrical energy as it applies a stopping force to the vehicle's axle and/or drive train in response to a stopping request. Therefore, and in accordance with regenerative braking, the kinetic energy is converted to electric energy, as the vehicle begins to slow down.

In order to operate the internal combustion engine (ICE) of a hybrid vehicle a fuel source must be consumed. This causes the engine to generate emissions that are harmful to the environment and the reduction of such emissions is a primary goal of any hybrid vehicle design. On the other hand, an electric drive system produces little or no emissions, however, the operation of such a system draws energy from a battery or plurality of batteries which ultimately must be recharged.

Accordingly, and in order to operate in a most efficient manner, either one or both of the energy sources of a hybrid vehicle should be operated in accordance with the most efficient usage of energy.

Additionally, a hybrid electric vehicle (HEV) encounters many operational states which affect the performance and or efficiency of the vehicle's operation.

Moreover, and as driving conditions vary, these operational states also vary.

For example, and during typical driving and/or operating conditions, the vehicle's battery system will lose a state-of-charge (SOC) in any one of the following instances: providing tractive energy to the vehicles drive train for either vehicle launch or maintaining speed in a pure electric vehicle (EV) mode; supplying energy to the vehicles climate control system, this is even more apparent when the ICE is not running; providing a synchronizing or active damping energy to a motor/generator system for synchronizing the drive train coupled to the vehicle's ICE; and providing operational energy for the vehicle's electrical accessories.

Of the aforementioned states only the first two (providing tractive energy and supplying energy to the climate control system) are controllable for state of charge (SOC) management.

On the other hand, the vehicle's batteries or battery system gains a state of charge (SOC) from the following sources: regenerative mechanical energy generated while the vehicle is braking or coasting down, this is known as "regenerative braking"; and electrical energy generated by a generator coupled to the vehicle's engine, that applies mechanical energy.

Of the aforementioned regenerative states only the charge generated by the engine is fully controllable, whereas the charge generated through regenerative braking can only be controlled by reducing the energy flowing into the batteries.

SUMMARY OF THE INVENTION

An object of the present invention is to provide a hybrid vehicle having a parallel propulsion system wherein the state of charge (SOC) is maintained at or near its nominal value by using the controllable quantities, during discharging and/or charging.

In an exemplary embodiment of the present invention a controller system configures the propulsion system of a hybrid vehicle to provide the most energy efficient means for meeting requested demands.

In another exemplary embodiment of the present invention a system configures the propulsion system of a hybrid vehicle to provide the lowest amount of emissions while at the same time meeting the requested driver demands.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
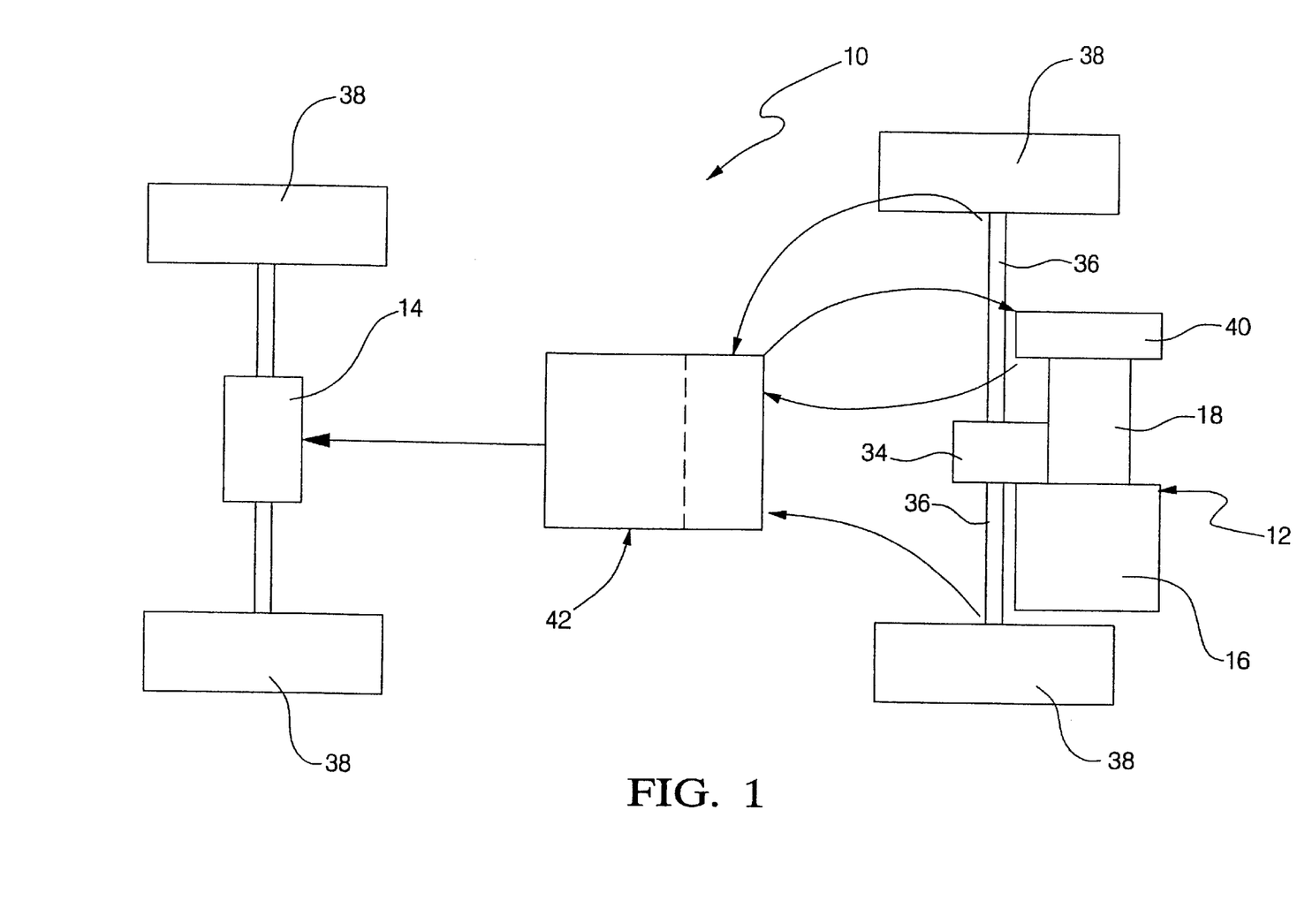
FIG. 1 is a partial schematic of a hybrid vehicle.

Referring now to FIG. 1, a hybrid vehicle system configuration contemplated for use with the present invention is illustrated.

A hybrid vehicle 10 is configured to have a rear propulsion system 12 and a front propulsion system 14. Rear propulsion system 12 has an internal combustion engine 16 which provides a driving force to an automated manual transmission 18 which converts the driving force of internal combustion engine 16 into the required torque for driving the rear wheels of hybrid vehicle 10.

In the preferred embodiment, front propulsion system 14 is an electric traction drive with a continuous torque output. Alternatively, vehicle 10 is equipped with only a rear propulsion system.

In the preferred embodiment, internal combustion engine 16 is a high-efficiency diesel engine such as a compression-ignition direct-injection CIDI engine. However, and in accordance with the present invention, engine 16 can be a high efficiency gasoline engine, employing various forms of combustion controls.

Figure 2:
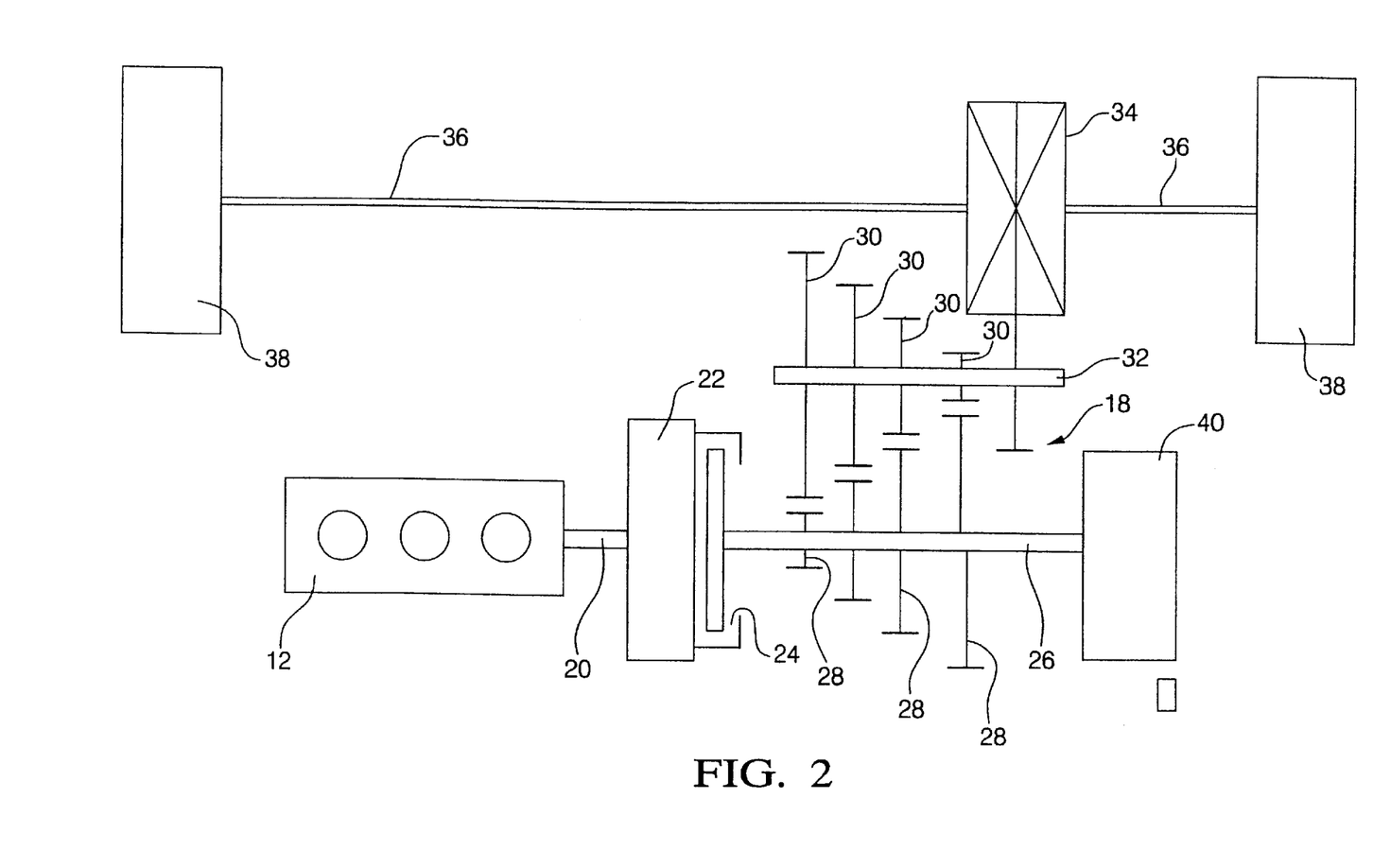
FIG. 2 is a partial schematic illustrating the rear propulsion configuration of the hybrid vehicle illustrated in FIG. 1.

Referring now to FIGS. 1 and 2, component parts of rear propulsion system 12 are illustrated. In response to a user or drivers manipulation of an accelerator mechanism (not shown) internal combustion engine 16 provides a rotational force to a driveshaft 20 that is coupled to a flywheel 22. In order to transfer the rotational force from flywheel 22 to automated manual transmission 18 a clutch 24 is positioned to engage and disengage flywheel 22.

Generally, clutch 24 is a planetary gear having a surface area that frictionally engages the surface area of flywheel 22.

Clutch 24 is coupled to an input shaft 26 of automated manual transmission 18. Input shaft 26 is coupled to a plurality of input gears 28. Each one of input gears 28 has a differing diameter and/or gear tooth ratio which provides a differing torque value which in response to a gearshift command makes contact with a corresponding one of a plurality of output gears 30 which are secured to an output shaft of 32 of automated manual transmission 18. Similarly, output gears 30 each have a differing diameter and/or gear tooth ratio.

Output shaft 32 ultimately provides a resulting driving force to a rear differential 34 and a respective axle 36 that provides a rotational force to rear wheels 38 of hybrid vehicle 10.

An electric motor/generator system 40 is also coupled to input shaft 26. Motor/generator system 40 is coupled to input shaft 26 at a position remote from clutch 24. Accordingly, and as a rotational force is applied to input shaft 26 motor/generator system 40 can be rotated to provide a source of electrical power for use in hybrid vehicle 10, as well as a rotational driving force to shaft 26, drawing electrical energy from the batteries.

In addition, and since motor generator system 40 is coupled to input shaft 26 of automated manual transmission 18, motor generator system 40 can apply a torque to input shaft 26 in order to synchronize the appropriate gear 28 with gear 30.

A hybrid system controller 42 provides command inputs to rear propulsion system 12 and front propulsion system 14. Hybrid system controller 42 also controls the motor/generator system 40 when transmission 18 is shifted. Since motor/generator system 40 is coupled to input shaft 26 controller 42 can send a signal to motor/generator system 40 in order to provide a force to input shaft 26 in order to rapidly synchronize input shaft 26 to the proper speed for engaging the next one of plurality of gears 30.

Motor/generator system 40 provides either a rotational positive force or a negative force to input shaft 26. For example, and in situations where the rotation of input shaft 26 must be increased in order to mesh the gears of input shaft 26 to the gears of output shaft 32, the motor portion of motor/generator system 40 provides a rotational positive force to input shaft 26.

Conversely, and in situations where the rotation of input shaft 26 must be slowed in order to mesh the gears of input shaft 26 with the gears of output shaft 32, the generator portion of motor/generator system 40 provides a rotational negative force to input shaft 26.

Accordingly, this feature allows the gears of transmission 18 to be shifted without having to open the clutch. This will result in faster shifts and higher overall efficiency with less interruption of the more efficient primary drive train, namely, the propulsion force of internal combustion engine 16.

Moreover, and in contravention to systems where the clutch is disengaged to shift the gears, there is no loss of the output energy of internal combustion engine 16 as the clutch remains engaged to the flywheel.

For example, as transmission 18 shifts from a lower gear to a higher gear input shaft 26 must be slowed to allow for the meshing of the appropriate one of the gears 28 to the appropriate one of gears 30. Accordingly, and in particular the generator system of motor/generator system 40, applies a torque force to input shaft 26 in order to slow its rotation thereby allowing the gears of transmission 18 to be meshed to allow for upshifting.

In addition, and as the rotation of input shaft 26 is slowed the generator portion of motor/generator system 40 is also rotated and accordingly, provides an electrical output which is either stored or used by hybrid vehicle 10.

Charge-sustaining operation is defined as the operation of the vehicle without having external means of (off-board) electric charging for the batteries in the vehicle. In the case of charge-sustaining hybrids, the on-board engine and generator do of the battery charging, which is similar to what is currently the norm for conventional vehicles. The control algorithms proposed in the instant application take the concept a little further, to improve the operating efficiency of the engine as well as a resulting fuel economy of the vehicle. The control algorithms proposed herein use the ability of the battery to store energy to "load-level" the engine, i.e., storing the energy by being charged from the engine at a higher efficiency, and then turning the engine off later, to send his energy to the wheels through the electric motors.

In accordance with the instant application, the controllable discharging events are used to intentionally reduce the state of charge (SOC) of the vehicle's battery system, if the SOC's value is close to 100%, thereby allowing better regenerative braking headroom. Therefore, and in accordance with the instant application, the climate control compressor-powering algorithm of a hybrid vehicle is based on the battery's state of charge. If the SOC is close to 100%, the engine's duty cycle, i.e., fraction of time the engine is on versus off, is reduced, and the engine is kept off for longer durations during light accelerations and cruising situations, when the vehicle is being driven in a pure electric mode, i.e., electric motors providing the propulsion force, drawing energy from the battery.

Also, the climate compressor is driven electrically to load-level the batteries when the SOC is higher than nominal and the ICE is turned off. Turning the engine off during light accelerations and cruising has a huge beneficial impact on the vehicle's fuel economy and emissions. Therefore, controllable discharging (providing energy to the vehicle's drive train and climate control compressor) is used to load-level the vehicle's batteries.

On the other hand, the controllable charging events are used to force the battery's SOC back to its nominal value, if the SOC has fallen below the nominal value due to higher rates of discharging, which may be caused by excessive loading upon the vehicles battery system, such as providing energy to drive the vehicle, its climate control compressor and accessories.

The vehicle's batteries are charged using mechanical energy generated by the ICE. In addition, the priority with which the battery charging torque is added to engine torque demand depends on how low the SOC has actually depleted.

Figure 3:
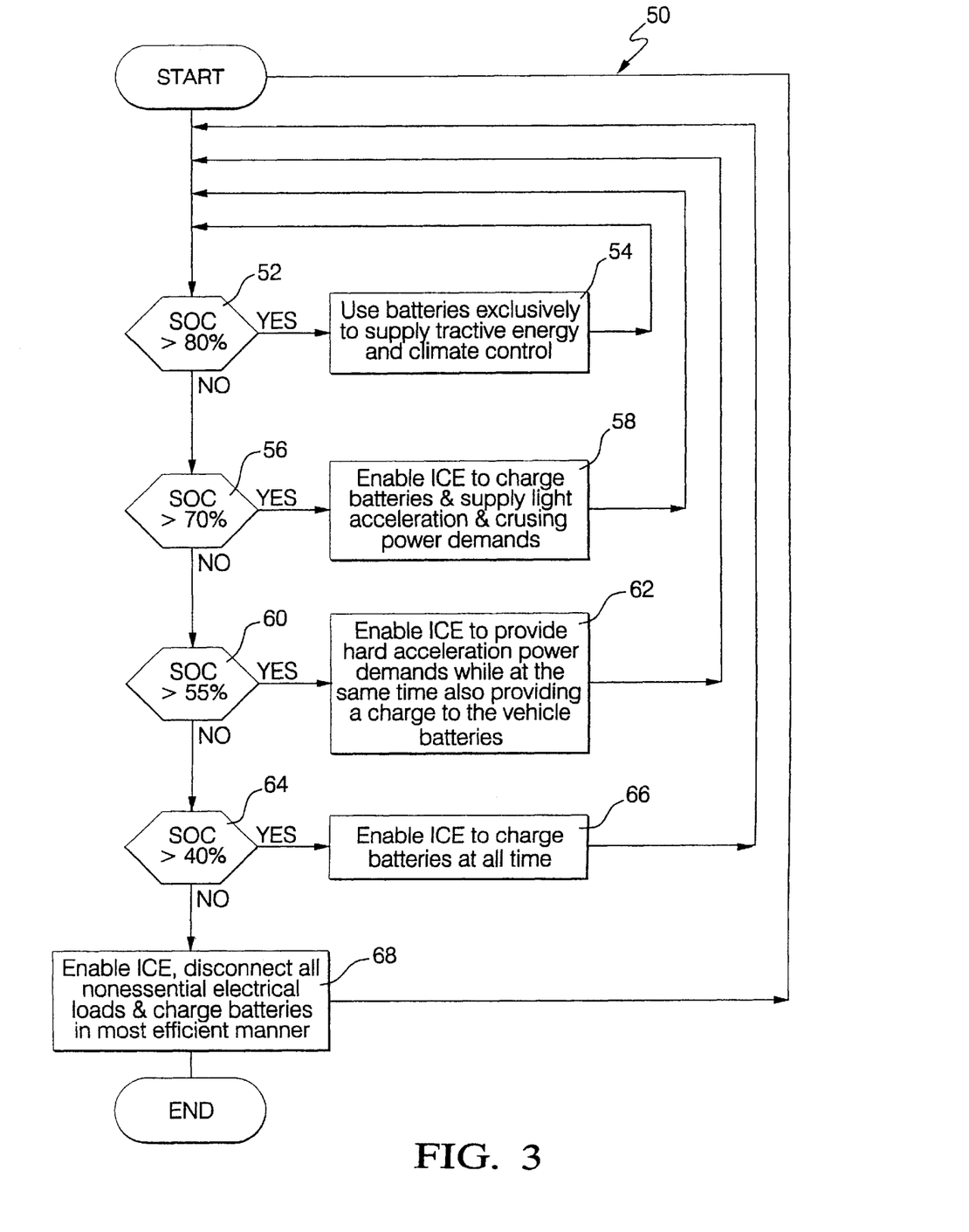
FIG. 3 is a flowchart illustrating the state of charge management system of an exemplary embodiment of the present invention.

Referring now to FIG. 3, a flow chart 50 illustrates portions of a possible command sequence of the state of charge management strategy used in accordance with an exemplary embodiment of the present invention. Here a first step or decision node 52 determines whether the state of charge of hybrid vehicle 10 is greater than 80% of its nominal value. The nominal value of SOC is a function of the battery technology. If so, a second step 54 instructs the controllable discharging events, namely, supplying energy for climate control and vehicle propulsion, to be operated solely on electrical power and draw their energy from the vehicle's battery system. In this operational configuration there is no need for hybrid vehicle 10 to operate ICE 16. Accordingly, the fuel efficiency and emission output of hybrid vehicle 10 in this configuration is at an optimal level.

If however, the SOC is less than or equal to 80% of the nominal valuea third step or decision node 56 determines whether the SOC is greater than 70%. If so, a fourth step 58 instructs ICE 16 to be started. In this operational configuration the torque load of ICE 16 is altered to provide a charge to hybrid vehicle 10 through motor/generator system 40 in addition to supplying a driving force in response to the vehicle's light acceleration and/or cruising power demands. Accordingly, and in this configuration, a percentage of the ICE's torque load is reserved for battery recharging.

If however, the SOC is less than or equal to 70% a fifth step or decision node 60 determines whether the SOC is greater than 55%. If so, the ICE of hybrid vehicle 10 is instructed by a six step 62 to provide the vehicle's hard acceleration power demands while at the same time also providing a charge to the vehicle's batteries. In this configuration, high-energy demands such as vehicle acceleration are now powered by the ICE. This produces the energy load upon the vehicles battery system in addition to a portion of the engine torque being devoted to battery recharging.

If the SOC is less than or equal to 55% a seventh step or decision node 64 determines whether the SOC is greater than 40%. If so, an eighth step 66 instructs the internal combustion engine to charge the vehicle's batteries at all times.

If however, the SOC is less than or equal to 40% battery recharging becomes a high priority, critical function and a ninth step 68 disconnects non-essential electrical loads of significant value, such as, the vehicle's climate control compressor, and, in some situations requiring aggressive acceleration, will even reduce the torque being supplied to propel the vehicle.

Accordingly, the command sequence illustrated in flow chart 50 utilizes controllable charging states, namely, mechanical energy from the ICE and proportionate load-level of the ICE, in order to offset the deviations of the SOC from its nominal value. The controllable charging states are manipulated in accordance with the deviations of the SOC.

In addition, and in order to replenish the depleted battery system in the quickest and the most energy efficient manner energy-efficiency maps are utilized to identify the most optimal way to replenish the vehicle's battery energy without having negative effects on the vehicle's fuel economy. Efficiency maps are 2-dimensional look-up tables, representing the efficiency of each component at different torque and speeds. These are measured by testing.

Flow chart 50, illustrates one possible command sequence for maintaining the state of charge in a hybrid vehicle. Of course, and in accordance with the instant application, it is contemplated that the percentage values of the vehicle's state of charge in each of the aforementioned decision nodes may vary in accordance with the vehicle's component parts and/or systems.

Figure 6:
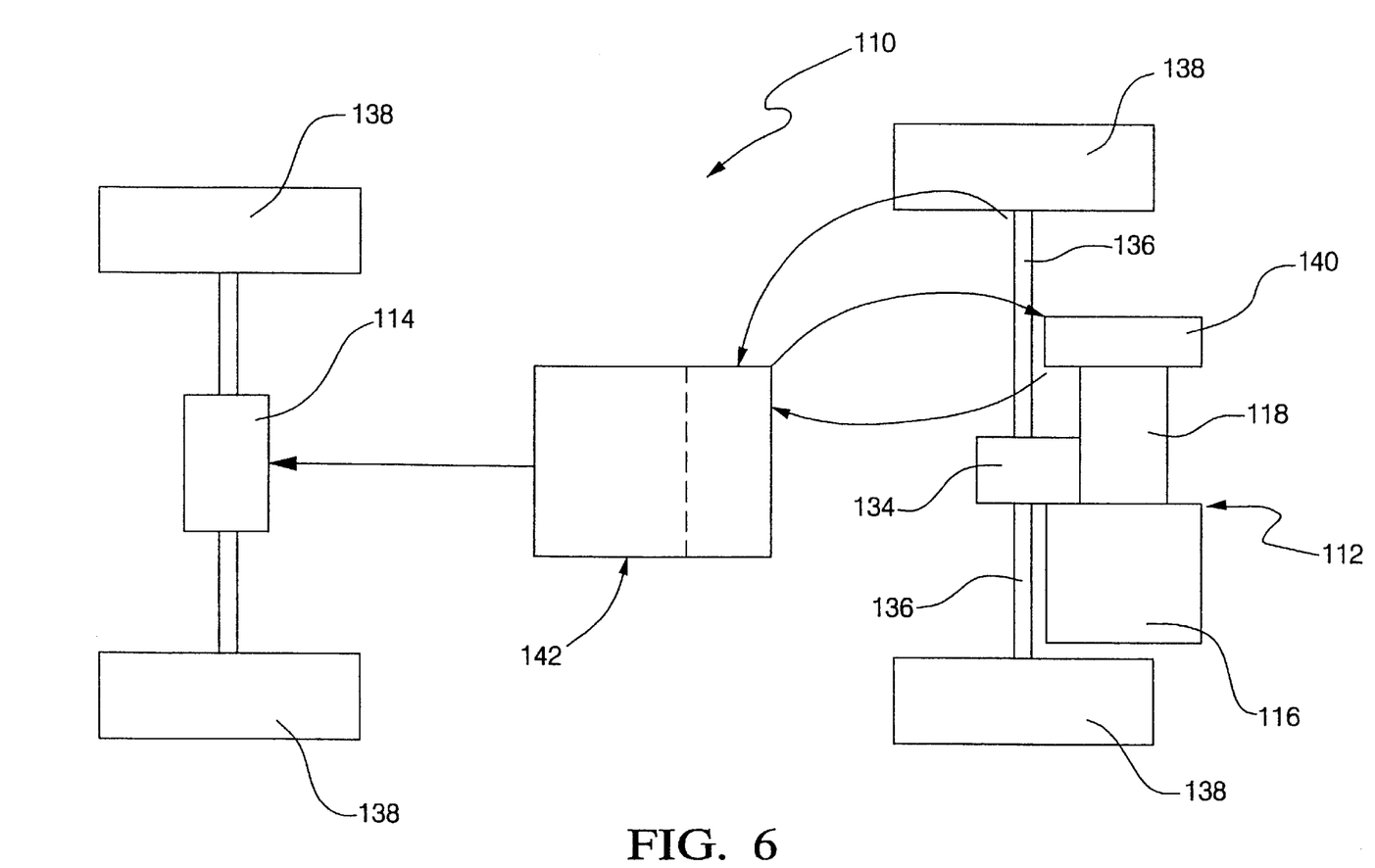
FIG. 6 is a partial schematic of a hybrid vehicle.
Figure 7:
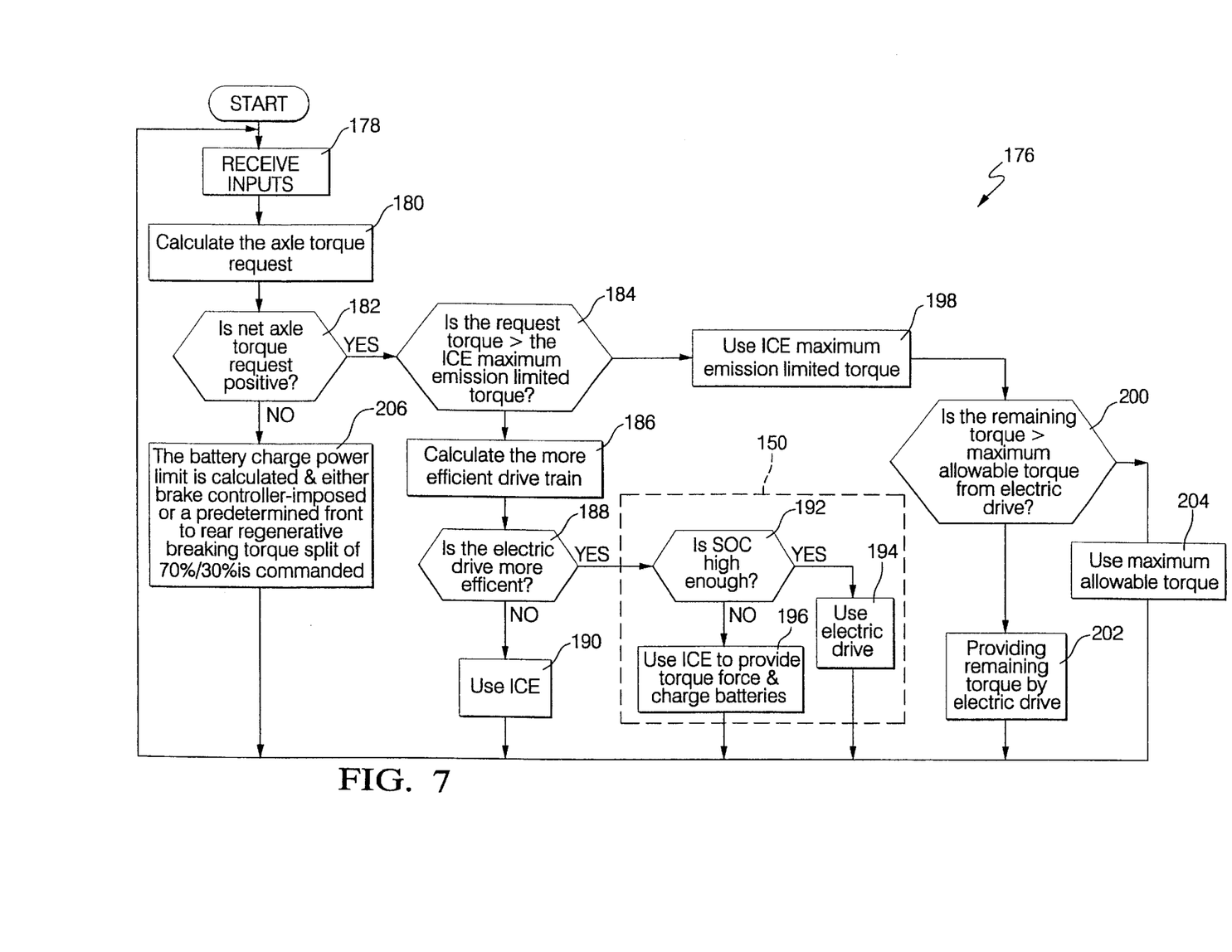
FIG. 7 is a flowchart illustrating the command sequence of an alternative embodiment of the present invention.
Figure 8:
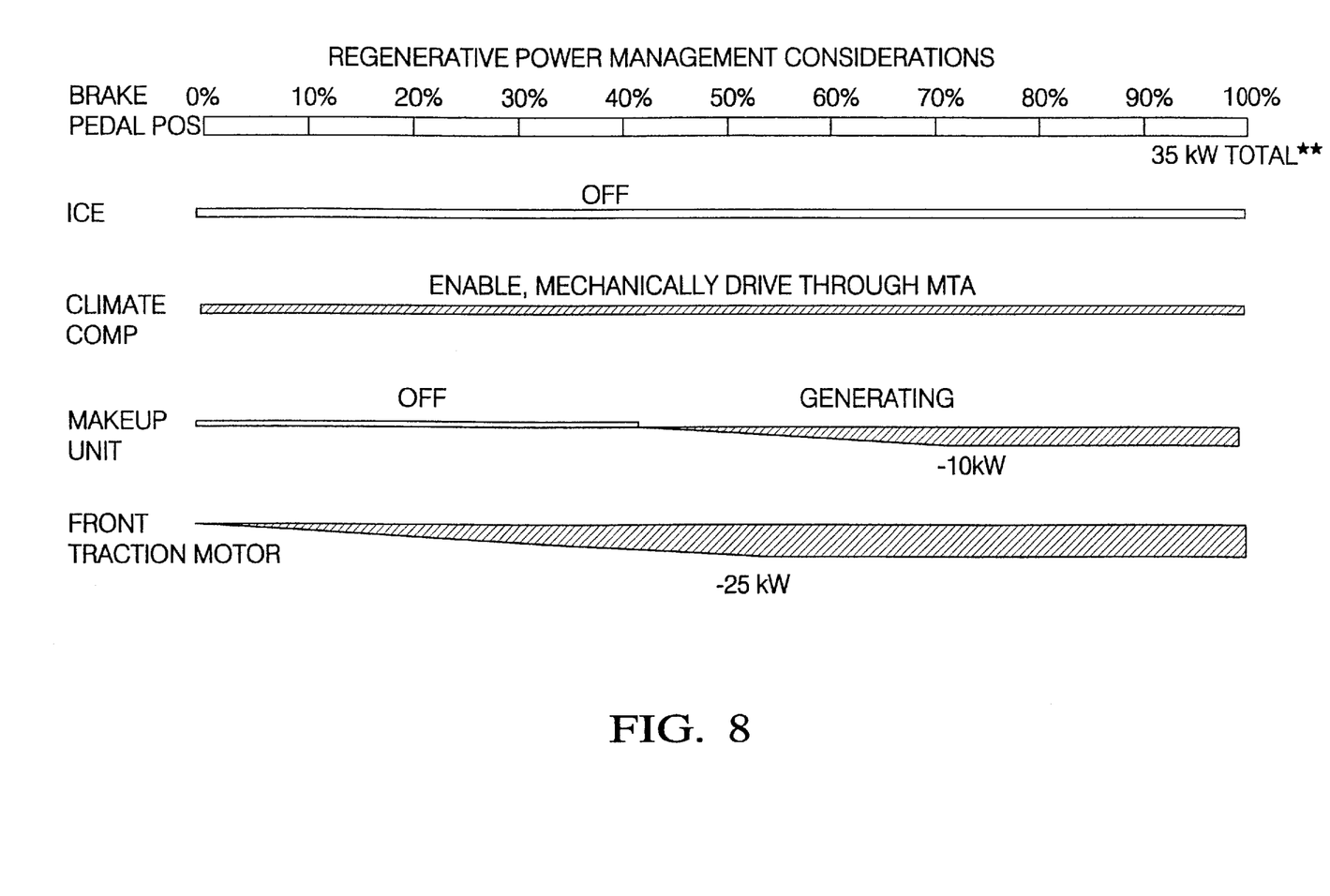
FIGS. 8 and 9 illustrate the power management considerations of the FIG. 7 embodiment.
Figure 9:
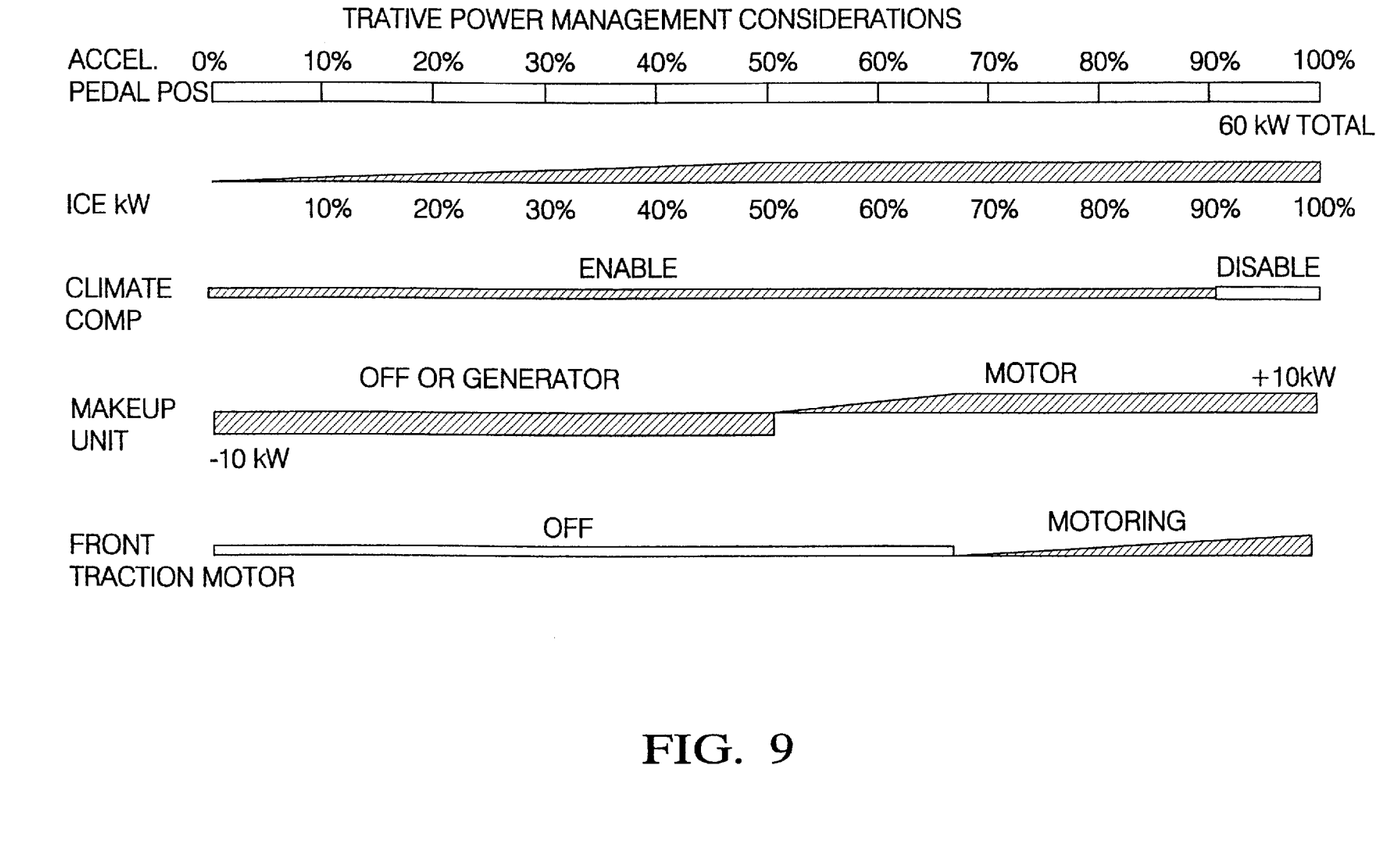

Referring now in particular to FIGS. 6 and 7, an alternative embodiment of the present invention is illustrated. In this embodiment component parts performing similar or analogous functions are numbered in multiples of 100.

Here a hybrid vehicle 110 has a hybrid system controller 142 that employs a torque management strategy in order to most efficiently supply a driving force in response to a user or command request.

Hybrid vehicle 110 has a rear propulsion system 112 and a front propulsion system 114. Rear propulsion system 112 has, among other elements an internal combustion engine 116, an automated manual transmission 118 and an electric motor/generator system 140.

Referring now in particular to FIG. 7, a possible command sequence employed by system controller 142 is illustrated by a flow chart 176.

The torque management strategy uses an algorithm that splits the driver's torque request into a torque demand for the ICE engine and a torque demand for the electric drive (front and a lower rear) in a parallel hybrid-electric vehicle, in order to deliver the driver's requested torque. This strategy is incorporated in the software, and enables the vehicle to maintain maximum fuel economy while generating a minimal amount of emissions. This is achieved irrespective of the driving conditions encountered and/or the vehicle operator's driving habits.

The algorithm uses the following information which is inputted into a first step 178: engine (ICE and electric) fuel economy and emission maps as functions of torque, speed and temperature; driver requested accelerator or interpreted coast-down torque from the accelerator pedal; interpreted regenerative braking torque from the brake controller; available maximum torque values from all traction components (the engine with transmission gear ratio, the front electric traction motor and the starter motor/generator); maximum allowable charge/discharge power for the traction battery pack; and speed of operation as well as temperature of each of the traction components.

A second step 180 determines a net axle torque request from the acceleration or coast-down torque request from the accelerator pedal and regenerative braking torque request from the brake controller. These inputs are combined to determine a net axle torque request (which is either positive or negative).

A third step or decision node 182 determines whether the net axle torque request is either positive (acceleration) or negative (coasting or decelerating or braking). If the net axle torque request is positive a fourth step or decision node 184 determines whether the net axle torque request is greater than the ICE maximum emission limited torque output which, of course, is a known value depending on the design characteristics of the hybrid vehicle's ICE and accompanying drivetrain.

If the net axle torque request is less than the ICE maximum machine limited torque output, a fifth step 186 determines the more efficient drivetrain (i.e. electric or ICE). This is calculated using the efficiency maps of electric drives and the ICE and its accompanying transmission whereby the energy losses are compared to for each drive in order to provide the necessary net axle torque force. For example, and when determining whether the electric drive is to be used, the calculation is made knowing that the ICE will be needed to the recharge the vehicle's battery.

Therefore, and based on these calculations the mechanical path with the least amount of energy losses is chosen to provide the necessary torque for the vehicle. A decision node or sixth step 188 determines whether the electrical drive is more efficient.

If not, the ICE is used to drive the vehicle. This command is executed by step 190.

If on the other hand the electrical drive is deemed more efficient, the battery available energy or state of charge (SOC) is determined by a decision node 192 in order to determine whether the electric drive of the vehicle can supply the necessary torque based upon the current SOC. If the SOC is acceptable a command step 194 instructs the electric drive to provide the necessary torque.

Conversely, if the SOC is too low, the command step 196 instructs the ICE to provide the necessary torque while at the same time providing an electrical charge to the vehicles batteries.

Alternatively, and as illustrated by the dashed lines, a state of charge management control system 150 is used to replace decision node 192, and steps 194 and 196. State of charge management control system 150 is similar to the system illustrated in FIGS. 1–3.

Referring back now to decision node 184 and if the requested torque is greater than the maximum emission limited torque of the ICE a step 198 instructs the ICE to provide its maximum emission limited torque to the axle.

A decision node 200 determines whether the remaining torque (requested torque-maximum emission limited torque of ICE) is greater than the maximum allowable torque of the electric drives (front and rear).

If not a step 202 instructs the electric drives to provide the remaining torque. If yes, a step 204 instructs the electric drives to provide their maximum torque.

Referring now to decision node 182, and if the requested torque is negative (braking or coast-down situation) a command step 206 determines the battery charge power limit and instructs either a brake controller-imposed or a predetermined front to rear regenerative braking torque split of 70%/30% to be acted upon the vehicles axles, and/or drivetrain (motor/generator system 140), in order to provide the necessary negative axle torque request.

The algorithm for this embodiment achieves high fuel economy and low emissions for a parallel hybrid vehicle.

With the correct sizing of the powertrain components, a high-performance parallel hybrid electric vehicle (car or truck) with an improved fuel economy can be realized.

The algorithm calibrations can be adjusted to provide customer satisfaction such as all-time traction control system as well as all-wheel drive system for this parallel hybrid vehicle.

The aforementioned methodology is general-purpose and it is not customized to a particular vehicle or powertrain configuration, and accordingly, it can be used to determine the torque split for any type of parallel hybrid vehicle where the electric drive torque and engine torque can be controlled independently of each other.

Figure 4:
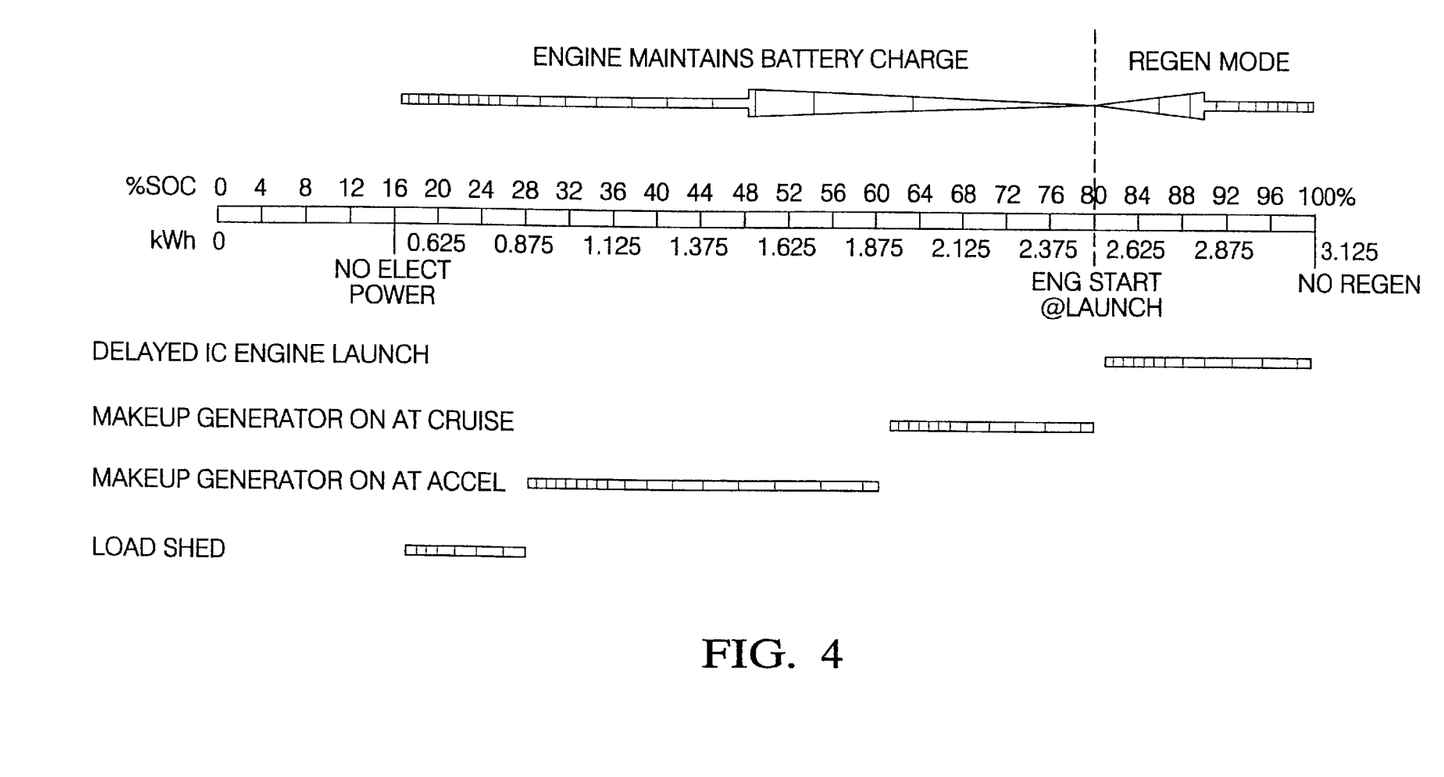
FIG. 4 illustrates the state of charge management of the FIG. 3 embodiment.
Figure 5:
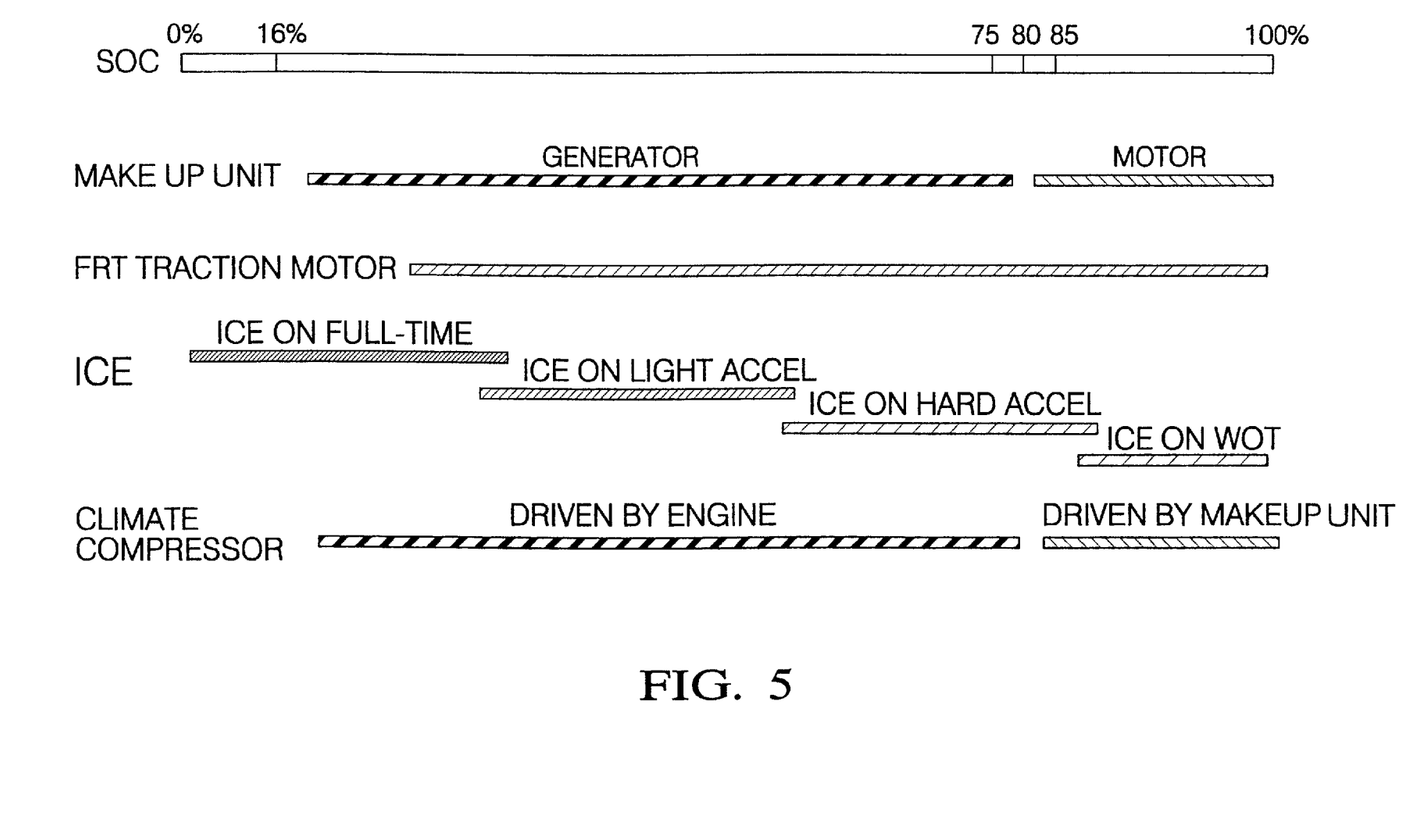
FIG. 5 illustrates the state of charge management of the FIG. 3 embodiment.

In addition, the command system illustrated in FIGS. 4 and 5 utilizes an algorithm which facilitates four-wheel regenerative prioritized braking (in response to a negative axle torque request) for the vehicle. This is also determined by step 206.

Figure 10:
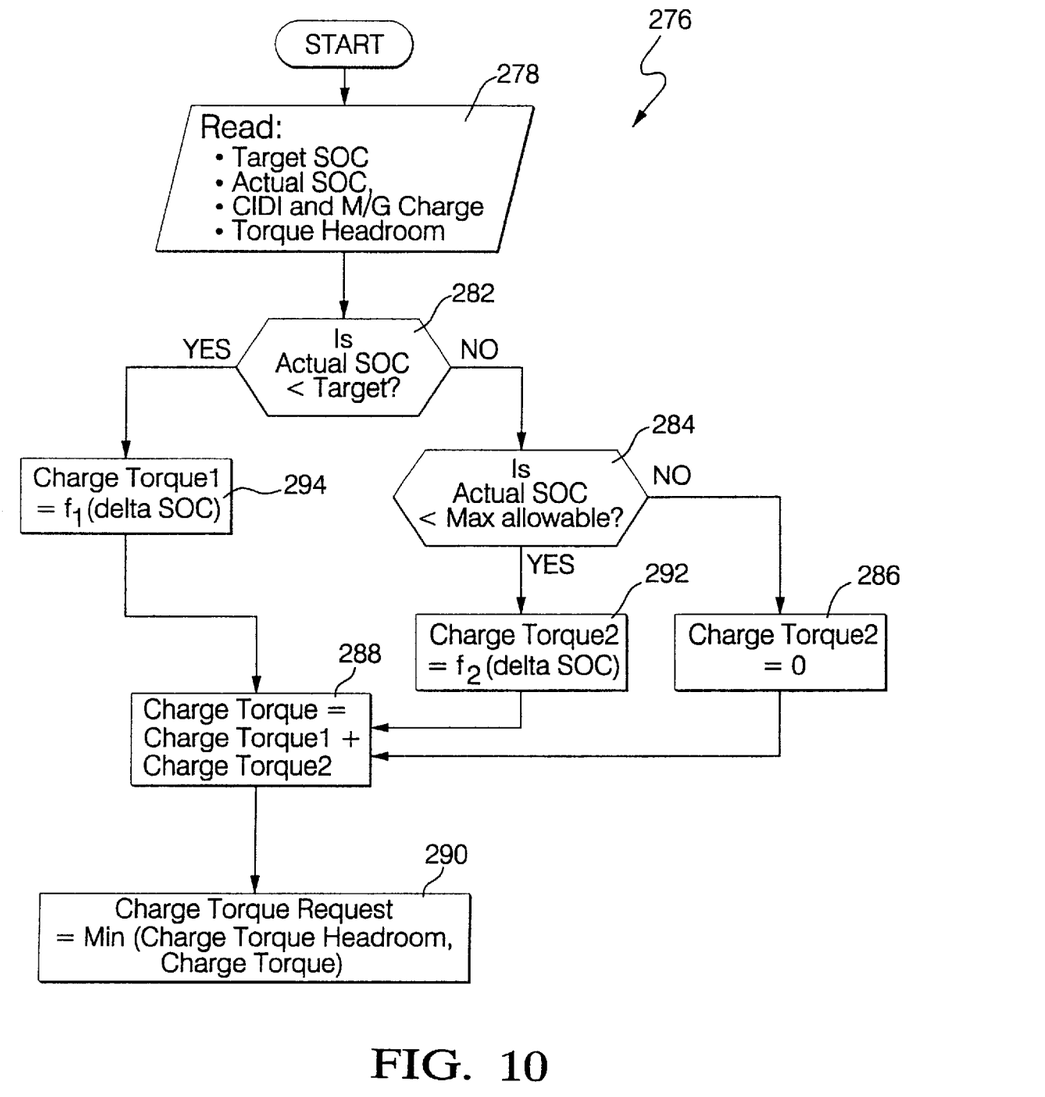
FIG. 10 illustrates a flowchart depicting the command sequence of an alternative embodiment of the present invention.

Referring now to in FIG. 10, another alternative embodiment of the present invention is illustrated. Here, a possible command sequence employed by system controller 142 is illustrated by a flow chart 276.

The battery state of charge management strategy uses an algorithm that utilizes a target state of charge and the vehicles actual state of charge. This strategy is incorporated in the software, and enables the vehicle to maintain a state of charge while also attaining maximum fuel economy. This is achieved irrespective of the driving conditions encountered and/or the vehicle operator's driving habits.

The algorithm uses the following information, which is inputted into a first step 278: target state of charge, actual state of charge, compression-ignition direct-injection CIDI engine and motor/generator charge and torque headroom.

A first step or decision node 282 determines whether the actual state of charge is less than the target state of charge. If the actual state of charge is not less than the target state of charge a second step or decision node 284 determines whether the actual state of charge is less than the maximum allowable state of charge. If the actual state of charge is greater than the maximum allowable state of charge of a command step 286 sets the charge torque2 to equal zero. A command step 288 performs the following function charge torque=charge torque1+charge torque2. A next step 290 determines the charge torque request from the following equation charge torque request=min (charge torque headroom, charge torque).

If on the other hand the actual state of charge is less than the maximum allowable state of charge a command step 292 sets the charge torque2 to equal $f_2$ (Delta SOC).

If decision node 282 determines that the actual state of charge is less than the target state of charge a command step 294 sets charge torque1=$f_1$ (delta SOC)

Accordingly, and as contemplated in accordance with the instant application, the vehicles batteries are charged at a predetermined rate through either the engine or motor/generator. The batteries can also be charged at an acceptable rate through regenerative braking. For example, acceptable can be determined as follows acceptable equals allowable by the batteries at the specific state of charge and temperature.

In addition, and as contemplated with the instant application, the vehicles batteries are discharged during heavy accelerations when the SOC is "sufficient", during light to moderate accelerations when SOC is "acceptably high" and it is more efficient to use the electric drive as opposed to the CIDI and during all accelerations when SOC is "very high".

The following calibrations are used to determine what is "sufficient", "acceptably high" and "very high".

$KE_{13}$ HybridVehicleBattery$_{13}$ Operation$_{13}$ SOC=30%—minimum acceptable electric drive SOC for NiMH batteries.

$KE_{13}$ Electric$_{13}$ Traction$_{13}$ SOC$_{13}$ Min=46%—in them SOC level at which motor/generator will begin to recharge the batteries.

$KE_{13}$ Electric$_{13}$ Traction$_{13}$ SOC$_{13}$ Max=52%—maximum SOC level at which motor/generator will stop recharge in the batteries.

KE₁₃ Pure₁₃ Elec₁₃ Trac₁₃ SOC=53%—minimum SOC for pure electric traction.

Referring now to NiMH batteries, sufficient SOC can be defined as follows, between 30–46%. Acceptably high SOC is defined as follows, between 46–52% and very high SOC is defined as greater than or equal to 52%. Of course, and as contemplated in accordance with the instant application, and as different types of batteries with varying discharge and charge rates are used, the aforementioned values may have a lesser or greater value and has indicated herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid vehicle having a state of charge control system for the hybrid vehicle's energy source, comprising:

a) a first propulsion system being configured and positioned to provide a driving force to a first pair of wheels;

b) a second propulsion system being configured and positioned to provide a driving force to a second pair of wheels;

c) a second propulsion system controller for actuating said second propulsion system; and d) a system controller for actuating said first propulsion system and providing command request to said second propulsion control system, said system controller utilizes a control algorithm for determining the necessary commands to be provided to said first and second propulsion systems so as to provide said hybrid vehicle with a continuous driving force, said control algorithm utilizes an input of the current state of charge of an electrical source for determining the necessary commands, said control algorithm determining if said input is greater than a first value if so, said control algorithm instructs said first propulsion system to provide said driving force to said first pair of wheels via said power supplied from said electrical source in response to a driver's request and all other vehicle systems are also powered by said electrical source;

if said input is less than said first value and greater than a second value, then said control algorithm instructs said second propulsion system to provide a supplemental electrical charge to said electrical source and supply light acceleration and cruising powered demands of said vehicle;

if said input is less than said second value and greater than a third value then said control algorithm instructs said second propulsion system to provide a supplemental electrical charge to said electrical source and said second propulsion system provides heavy acceleration power demands of said vehicle;

if said input is less than said third value and greater than a fourth value, then said control algorithm instructs said second propulsion system to continuously charge said electrical source; and if said input is less than said the fourth value then said control algorithm disconnects all non-essential electrical loads from electrical source.

2. The hybrid vehicle as in claim 1, wherein said second propulsion system comprises:

e) an internal combustion engine providing a driving force to an automated manual transmission having an input shaft and an output shaft, said output shaft being configured, dimensioned and positioned to provide a driving force to said second set of wheels.

3. The hybrid vehicle as in claim 2, further comprising:

f) a motor/generator system being coupled to said input shaft at a first position and said input shaft being coupled to said internal combustion engine at a second position, said second position being remote from said first position, said motor/generator system is configured to provide a driving force to said input shaft or in the alternative receive a driving force from said input shaft.

4. The hybrid vehicle as in claim 3, wherein said motor/generator system provides a torque force to said input shaft in order to facilitate the shifting of said transmission without decoupling said input shaft from said internal combustion engine.

5. The hybrid vehicle as in claim 3, wherein said motor/generator system generates said electrical charge to be utilized by said hybrid vehicle.

6. The hybrid vehicle as in claim 3, wherein said system controller utilizes a computer algorithm in order to determine the torque force to be applied to said input shaft in order to facilitate the shifting of said transmission.

7. The hybrid vehicle as in claim 1, wherein said first value is equal to eighty percent state of charge of said electrical source and said second value is equal to seventy percent state of charge of said electrical source and said third value is equal to fifty five percent state of charge of said electrical source and said fourth value it is equal to forty percent of said state of charge of said electrical source.

8. A vehicle having a state of charge control system for the vehicle's energy source, omprising:

a first drivetrain for providing a driving force to a pair wheels of said vehicle;

a second drivetrain for providing a driving force to a second pair of wheels of said vehicle;

a controller for determining which of said drivetrains are to be used to provide a driving force to said vehicle in response to a user applied or command request, said controller receiving an input of the current state of charge of an electrical source and said input determines, in part, which of said drivetrains are to be used if said state of charge is greater than eighty percent of the capacity of said electrical source, said electrical source is used exclusively to supply propulsion to said vehicle and power said vehicle's climate control systems, wherein said eighty percent of the capacity of said electrical source is defined as a first value and if said input is less than said first value and greater than a second value, said second value being-less than said first value then said control algorithm instructs said second propulsion system to provide a supplemental electrical charge to said electrical source and supply high acceleration and cruising powered demands of said vehicle;

if said input is less than said second value and greater than a third value, said third value being less than said second value then said control algorithm instructs said second propulsion system to provide a supplemental electrical charge to said electrical source and said second propulsion system provides heavy acceleration power demands of said vehicle;

if said input is less than said third value and greater than a fourth value, said fourth value being less than said third value then said control algorithm instructs said second propulsion system to continuously charge said electrical source; and if said input is less than said the fourth value then said control algorithm disconnects all non-essential electrical loads from electrical source.

9. A vehicle as in claim 8, wherein said first drivetrain is electrically powered.

10. A vehicle as in claim 9, wherein said second drivetrain is powered by an internal combustion engine, said second drivetrain is configured to also receive a driving force from an electrically powered motor, said electrically powered motor receiving energy from said electrical source.

11. A vehicle as in claim 10, wherein said controller utilizes a control algorithm which receives an input of the current state of charge of said electrical source, said algorithm based upon said input value determines the proportionate amount of energy to be supplied by said drivetrains if said state of charge is greater than eighty percent of the capacity of said electrical source said electrical source is used exclusively to supply propulsion to said vehicle and powers said vehicle's climate control systems.

12. A vehicle as in claim 11, wherein said second drivetrain includes a motor/generator that is configured to provide a secondary electrical source.

13. A vehicle as in claim 12, wherein said algorithm determines the proportionate amount of said secondary electrical source is to be diverted to recharge said electrical source.

14. The vehicle as in claim 8, wherein said first value is equal to eighty percent state of charge of said electrical source and said second value is equal to seventy percent state of charge of said electrical source and said third value is equal to fifty five percent state of charge of said electrical source and said fourth value it is equal to forty percent of said state of charge of said electrical source.

* * * * *